United States Patent
Digianantonio et al.

(10) Patent No.: US 11,920,969 B2
(45) Date of Patent: Mar. 5, 2024

(54) SYSTEMS AND METHODS FOR MEASURING THE FILLING LEVEL OF A SILO

(71) Applicant: NANOLIKE, Labege (FR)

(72) Inventors: Lucas Digianantonio, Toulouse (FR); Jean-Jacques Bois, Toulouse (FR)

(73) Assignee: NANOLIKE, Labege (FR)

( * ) Notice: Subject to any disclaimer, the term of this patent is extended or adjusted under 35 U.S.C. 154(b) by 309 days.

(21) Appl. No.: 17/605,425

(22) PCT Filed: Apr. 30, 2020

(86) PCT No.: PCT/EP2020/062024
§ 371 (c)(1),
(2) Date: Oct. 21, 2021

(87) PCT Pub. No.: WO2020/221857
PCT Pub. Date: Nov. 5, 2020

(65) Prior Publication Data
US 2022/0187116 A1    Jun. 16, 2022

(30) Foreign Application Priority Data
Apr. 30, 2019  (FR) ..................... 19 04594

(51) Int. Cl.
*G01F 23/20*    (2006.01)
*G01G 3/12*    (2006.01)
(Continued)

(52) U.S. Cl.
CPC .............. *G01F 23/20* (2013.01); *G01K 13/00* (2013.01); *G01G 3/12* (2013.01); *G01G 17/04* (2013.01); *G01G 23/3735* (2013.01); *H04Q 9/00* (2013.01)

(58) Field of Classification Search
CPC .......... G01F 23/20; G01K 13/00; G01G 3/12; G01G 17/04; G01G 23/3735; H04Q 9/00
See application file for complete search history.

(56) References Cited

U.S. PATENT DOCUMENTS 4,064,744 A * 12/1977 Kistler ..................... G01B 7/18
73/849
5,493,903 A * 2/1996 Allen ...................... G01F 23/20
73/290 R
(Continued)

FOREIGN PATENT DOCUMENTS

CA      2371068      8/2003
WO    2008037095    4/2008

OTHER PUBLICATIONS

International Search Report dated Jun. 29, 2020.

*Primary Examiner* — Nathaniel T Woodward
*Assistant Examiner* — Philip L Cotey
(74) *Attorney, Agent, or Firm* — IPSILON USA, LLP

(57) ABSTRACT

The invention relates to a system (100) and a method (200) for measuring the filling level of a silo (110) for storing and mixing at least one bulk material, the silo being provided with a plurality of support legs (111) on the ground. The system comprises:
- a single deformation sensor (120) provided to be fixed to a single support leg of the silo so that the deformation sensor can detect deformations of the support leg in order to generate at least one measurement signal which comprises the deformation values,
- a first wireless communication means (130) provided to transmit the measurement signal, and
- a remote server (140) which comprises a second wireless communication means and a processor, the processor
(Continued)

being provided to process the measurement signal so as to obtain an estimation of the filling level of the silo.

12 Claims, 4 Drawing Sheets

(51) Int. Cl.
*G01K 13/00* (2021.01)
*G01G 17/04* (2006.01)
*G01G 23/37* (2006.01)
*H04Q 9/00* (2006.01)

(56) References Cited

U.S. PATENT DOCUMENTS

| | | | | |
|---|---|---|---|---|
| 6,513,373 | B1* | 2/2003 | Horne | G01F 23/20 |
| | | | | 73/296 |
| 6,636,820 | B2* | 10/2003 | Livingston | G01G 23/01 |
| | | | | 453/32 |
| 8,444,312 | B2* | 5/2013 | Hagan | E21B 21/062 |
| | | | | 366/181.8 |
| 2005/0284381 | A1* | 12/2005 | Bell | A01K 5/0283 |
| | | | | 119/51.02 |
| 2007/0056368 | A1* | 3/2007 | Schneiter | G01F 23/20 |
| | | | | 177/253 |
| 2011/0063942 | A1* | 3/2011 | Hagan | E21B 21/062 |
| | | | | 366/152.2 |
| 2014/0157889 | A1* | 6/2014 | Eakin | G01F 23/205 |
| | | | | 73/296 |
| 2017/0313499 | A1* | 11/2017 | Hughes | B60P 3/00 |
| 2019/0056258 | A1* | 2/2019 | Gelada Camps | G01F 23/2928 |
| 2019/0265015 | A1* | 8/2019 | Michiwaki | G01B 7/16 |

\* cited by examiner

SYSTEMS AND METHODS FOR MEASURING THE FILLING LEVEL OF A SILO

RELATED APPLICATION

This application is a National Phase of PCT/EP2020/062024 filed on Apr. 30, 2020, which claims the benefit of priority from French Patent Application No. 19 045594, filed on Apr. 30, 2019, the entirety of which are incorporated by reference.

TECHNICAL FIELD

The invention relates to the measurement of the filling level of silos used for storage and mixing of bulk material. More particularly, the invention relates to a system and a method for remote management of the stocks of bulk material present in such silos.

WO2008037095 describes a similar system.

PRIOR ART

In sectors which use silos, the suppliers of bulk material undertake to fill the silos of each concern as requested. In practice, an owner of a concern will often realise at the last minute that his stock of a bulk material is about to run out. In this case, the owner thus requests an urgent delivery, which incurs considerable additional logistics costs.

In order to solve this problem the installation of a remote monitoring capability for the filling state of the silos of the concern has been contemplated. In this case, it is not necessary to determine the weight or mass of the bulk materials present in the silos. Indeed, it will generally suffice to know that the silo is empty, full or partially filled.

From CA2371068A1 a system is known for remote monitoring of the filling state of holding bins such as bins for wood chips. For a holding bin comprising four support posts, the system of CA2371068A1 uses a load sensor for each support post. In the system of CA2371068A1, each load sensor is formed in a square plate which comprises a mounting hole at each of these four corners. The system of CA2371068A1 uses a microcontroller disposed in the proximity of the load sensors in order to produce an average of their measurements. The microcontroller then communicates the loading or filling state of the holding bin to a web server having a user interface enabling this state to be made accessible via the Internet.

However, the use of such a system is high in cost owing to the large number of sensors to be installed in a single concern. Indeed, in the prior art, the number of sensors to be installed depends on the number of support posts of the holding bin.

Furthermore, the use of such a system is high in cost owing to the large number of microcontrollers to be maintained. Indeed, the prior art necessitates at least one microcontoller per holding bin in order to determine the loading or filling state thereof.

Moreover, the dimensions of the load sensor need to be modified depending on the geometry of the support posts of the holding bin.

SUMMARY OF THE INVENTION

The invention aims to overcome these disadvantages.

The invention aims in particular to propose an inexpensive and flexible system for determining a datum representing the filling rate of a silo. Thus, in accordance with the invention, the use of a system of the metrological type is not necessary provided that the reliability of the proposed system is ensured.

In this respect, the inventors have noticed that the use of a single deformation sensor on a single leg of a silo sufficed to permit reliable determination of the filling rate of said silo and/or variation of its filling rate.

The invention thus relates to a system for measuring the filling level of a silo used for storage and mixing of at least one bulk material. The system is provided to operate with a silo which is provided with a plurality of support legs on the ground.

In practice, the system comprises:
- a single deformation sensor provided to be fixed to a single support leg of the silo so that the deformation sensor can detect the deformations of the support leg in response to the introduction or extraction of the bulk material, the deformation sensor being provided to convert the detected deformations into deformation values in order to generate at least one measurement signal which comprises the deformation values,
- a first wireless communication means provided to transmit the measurement signal, and
- a remote server which comprises a second wireless communication means and a processor, the second wireless communication means being provided to receive the measurement signal, the processor being provided to effect digital processing of the measurement signal so as to obtain an estimation of the filling level of the silo from a mathematical law which links the filling rate of the silo and the variation of the deformation values contained within the measurement signal.

In a first particular embodiment, the deformation sensor further comprises an electronic circuit to generate the measurement signal and the auxiliary signal. Furthermore, the deformation sensor comprises a connector electrically connected to the electronic circuit, the connector being provided to make a wired connection between the deformation sensor and the first wireless communication means.

In a second particular embodiment, the deformation sensor is further provided to generate an auxiliary signal which is associated with the measurement signal, the electronic circuit is adapted to add a timestamp of the acquired deformation values to the auxiliary signal, the first wireless communication means is further provided to transmit the auxiliary signal, the second wireless communication means is further provided to receive the auxiliary signal, and the processor is further provided to effect digital processing of the auxiliary signal.

In a third particular embodiment, the system further comprises a temperature sensor provided to measure at least one temperature in the proximity of the support leg of the silo, to convert the temperature into a temperature value and to add the temperature value to the measurement signal.

In a fourth particular embodiment, the system further comprises a geolocation sensor provided to determine a geographical position of the deformation sensor, to convert the geographical position into a geographical position value and to add the geographical position value to the auxiliary signal.

In a fifth particular embodiment, the processor determines the filling level of the silo according to—in addition—a speed of variation of the detected deformation values.

In a sixth particular embodiment, the digital processing of the measurement signal and of the auxiliary signal by the processor comprises the determination of a group of corrective parameters which permit the effect of the temperature on the support leg of the silo and the effect of the weather on the acquisition performance of the deformation sensor to be taken into account.

In a seventh particular embodiment, the deformation sensor comprises a proof body which comprises two end sections through which the proof body is fixed to the support leg of the silo.

In an example of the seventh particular embodiment, the deformation sensor is fixed to the support leg of the silo by screws.

In another example of the seventh particular embodiment, the deformation sensor can be fixed to the support leg of the silo by adhesive.

In an eighth particular embodiment, the system further comprises a housing provided to enclose a middle section of the proof body and the connector, the connector protruding from the housing.

The invention also relates to a method for measuring the filling level of a silo used for storage and mixing of at least one bulk material. The method is provided to be used with a silo which is provided with a plurality of support legs on the ground.

In practice, the method comprises:
- a first step of providing a single deformation sensor provided to be fixed to a single support leg of the silo so that the deformation sensor can detect deformations of the support leg in response to the introduction or extraction of the bulk material, the deformation sensor being provided to convert the detected deformations into deformation values in order to generate at least one measurement signal which comprises the deformation values,
- a first step of fixing the deformation sensor to the support leg of the silo,
- a second step of providing a first wireless communication means provided to transmit the measurement signal, and
- a second step of fixing the first wireless communication means to the support leg of the silo,
- a step of making a wired connection between the deformation sensor and the first wireless communication means, and
- a third step of providing a remote server which comprises a second wireless communication means and a processor, the second wireless communication means being provided to receive the measurement signal, the processor being provided to effect digital processing of the measurement signal so as to obtain an estimation of the filling level of the silo from a mathematical law which links the filling rate of the silo and the variation of the deformation values contained within the measurement signal.

Figure 1:
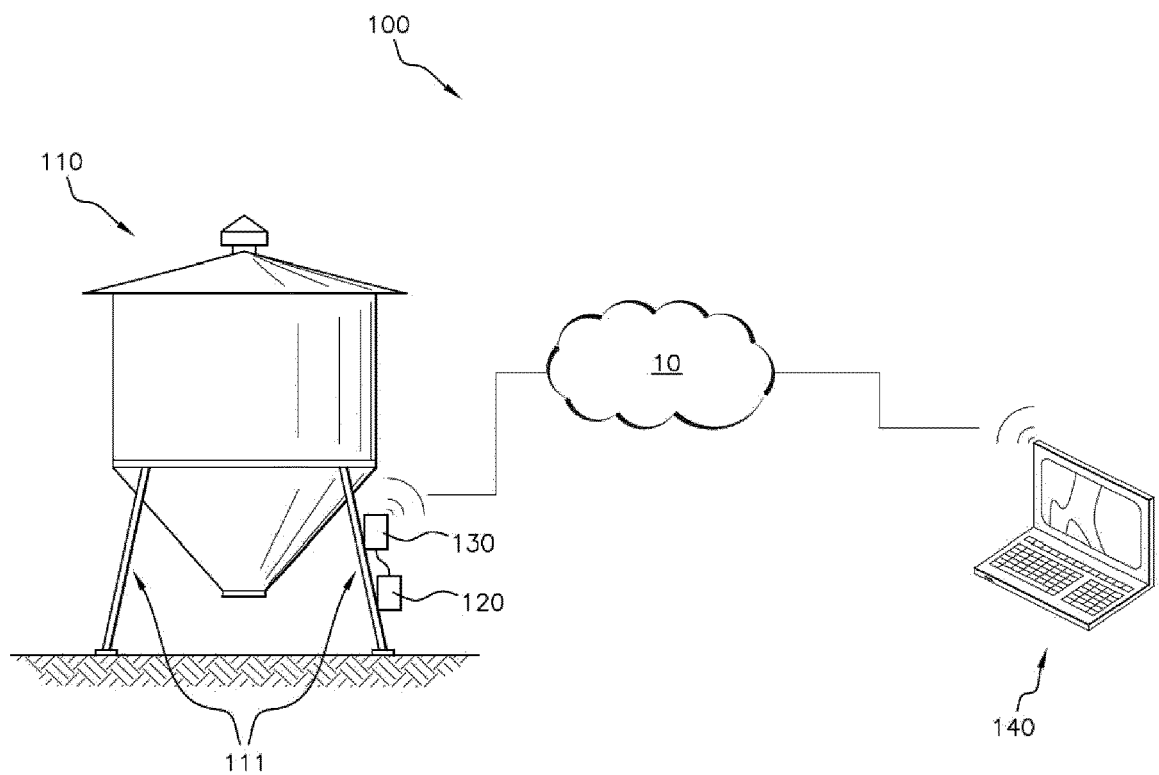
FIG. 1 shows a system for measuring the level of a silo in accordance with the invention.
Figure 2A:
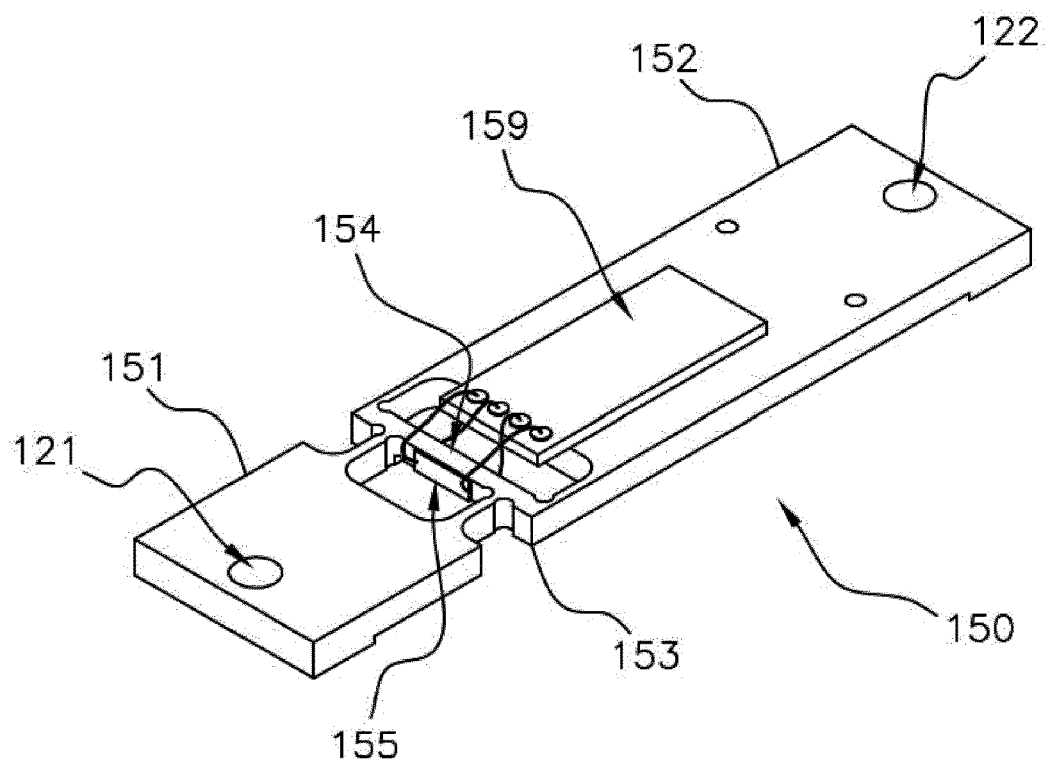
FIG. 2A shows a proof body of a deformation sensor in accordance with the invention.
Figure 2B:
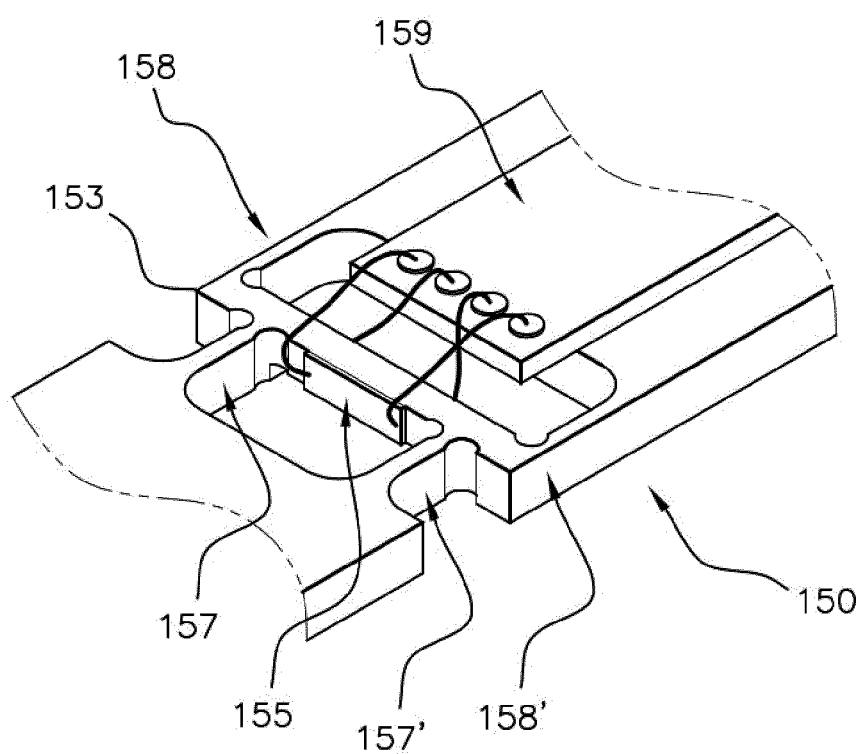
FIG. 2B shows a first enlarged view of FIG. 2A.
Figure 2C:
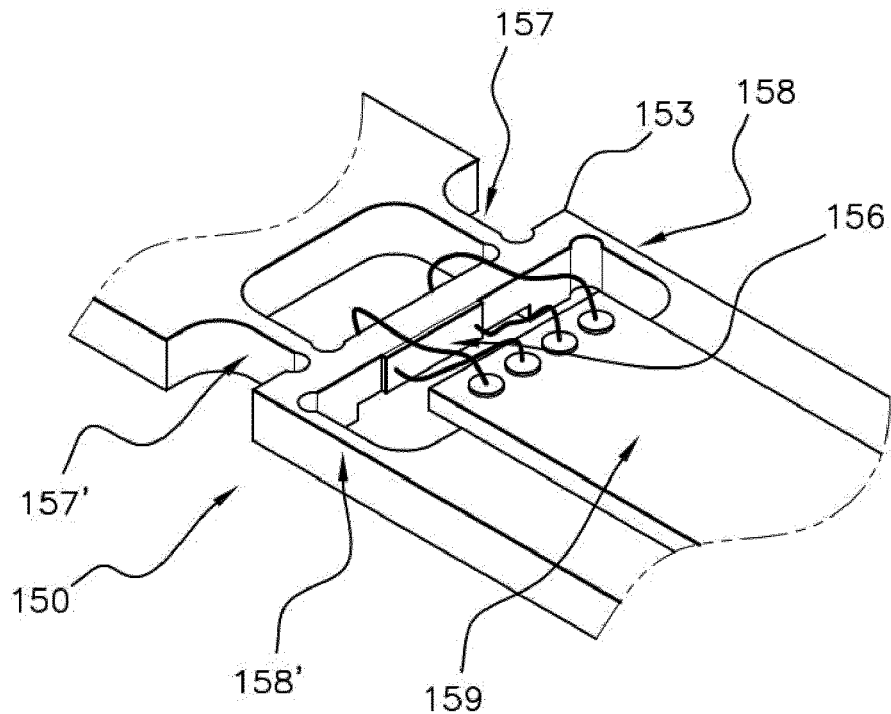
FIG. 2C shows a second enlarged view of FIG. 2A.
Figure 3:
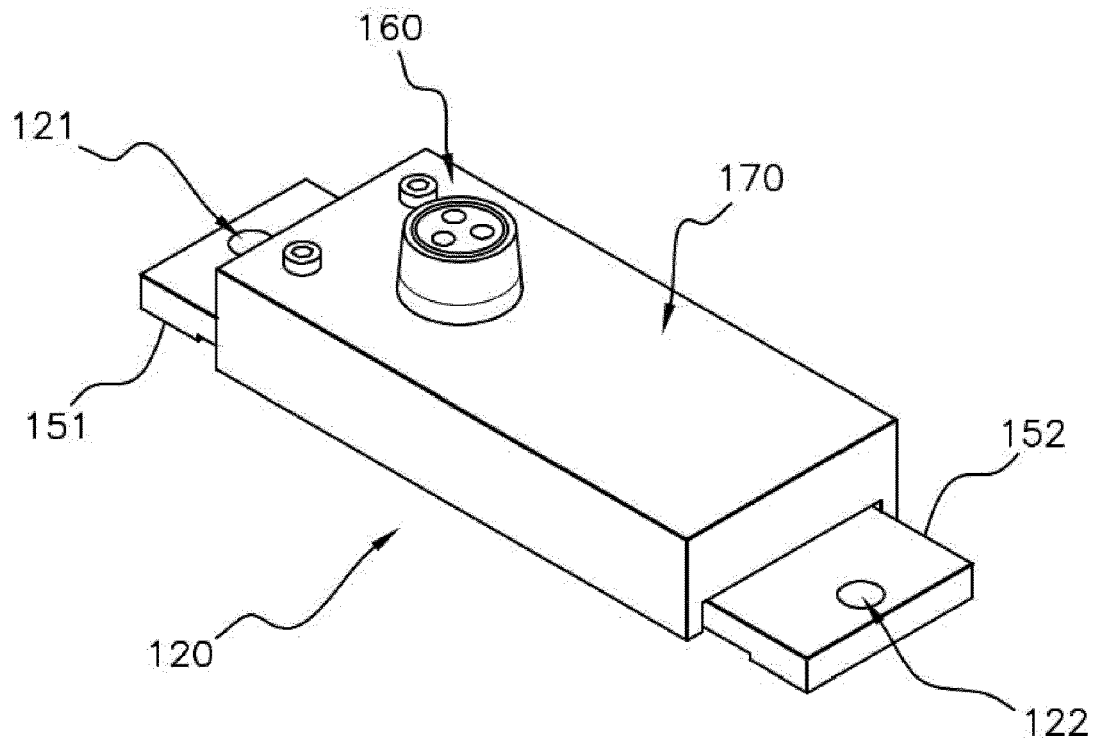
FIG. 3 shows a deformation sensor in accordance with the invention.
Figure 4:
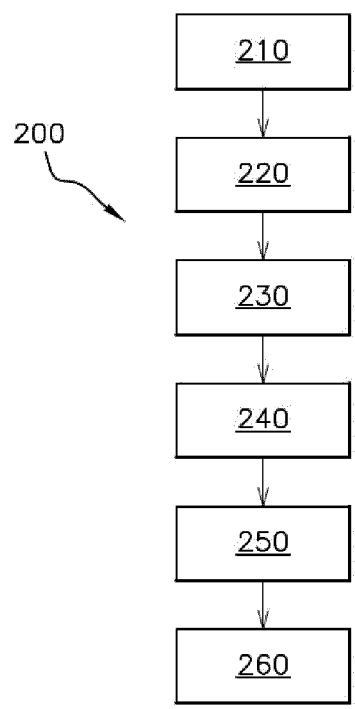
FIG. 4 shows a method for measuring the level of a silo in accordance with the invention.

The figures are not necessarily drawn to scale, in particular in terms of thickness, this being for illustrative purposes.

DESCRIPTION OF EMBODIMENTS

The figure illustrates a system 100 for measuring the filling level of a silo 110 provided for storage and/or mixing of at least one bulk material.

In the invention, the silo 110 is of a known type. Furthermore, bulk material is understood to be any flowable material. For example, the bulk material is selected from the group formed by liquids and powdery materials. Powdery materials include, in particular, powdery solids.

In the invention, the silo 110 is provided with a plurality of support legs 111 on the ground. In the example of the figure, the silo 110 comprises two support legs 111 on the ground. However, in accordance with the invention, the silo 110 can comprise more than two support legs 111 on the ground without requiring substantial modifications to the invention.

The system 100 comprises a single deformation sensor 120, a first wireless communication means 130 and a remote server 140.

The inventors have chosen to use, for each silo, a single deformation sensor with increased sensitivity. The deformation sensor in accordance with the invention is of the type described in U.S. Pat. No. 4,064,744 of Kistler. However, in the invention, this sensor is used in a different manner to that recommended in U.S. Pat. No. 4,064,744. Indeed, in practice, it is recommended to use a number of variants of the sensor depending on the type of silo leg. This is not the case in the invention where a single form of sensor is used irrespective of the type of silo leg. Indeed, as explained below, the measurement processing is all transferred outside the sensor. It is thus not necessary to modify its dimensions according to the type of support leg of the silo.

In the figure, the deformation sensor 120 is provided to be fixed to a single support leg 111 of the silo 110 among the plurality of support legs 111 of the silo 110. Thus, in the invention, the deformation sensor 120 does not come into contact with the contents of the silo 110.

For this purpose, as illustrated in the figures, the deformation sensor 120 comprises a proof body which comprises two end sections 151, 152 through which the proof body can be fixed to the support leg 111 of the silo 110.

In one example, the deformation sensor 120 is fixed to the support leg 111 of the silo 110 by screws passing through the fixing holes 121, 122.

In another example, the deformation sensor 120 is fixed to the support leg 111 of the silo 110 by other fixing or mounting means such as adhesive.

The deformation sensor 120 is preferably fixed at a location on the support leg 111 of the silo 110 where it is possible to measure a maximum deformation of the support leg 111 of the silo 110.

In the invention, the deformation sensor 120 is fixed so that it can detect the deformations of the support leg 111 in response to the introduction or extraction of the bulk material. Depending on the placement of the deformation sensor 120 on the support leg 111 of the silo 110, the deformation sensor 120 can detect the longitudinal and/or transverse deformations undergone by the support leg 111 of the silo 110.

For this purpose, the proof body is in the form of a plate formed as one piece with a generally rectangular transverse section.

In one particular embodiment, the plate forming the proof body comprises at least one material which is able to have homogeneous or non-homogeneous final deformations and which is selected from the group formed by metal materials, polymer materials, ceramic materials and composites thereof.

In another particular embodiment, the plate which forms the proof body has an overall rectangular parallelepiped shape with a width greater than 0.5 cm—in particular less than 2.5 cm, e.g. of the order of 1.5 cm to 2 cm—, a length greater than 5 cm—in particular less than 10 cm, e.g. of the order of 6.5 cm to 8 cm—and a height greater than 0.15 cm—in particular less than 0.4 cm, e.g. of the order of 0.28 cm to 0.3 cm.

Furthermore, the proof body comprises a middle section 153 which comprises a deformation bar 154.

The deformation bar 154 is disposed substantially perpendicularly to the axis of the proof body and connected mechanically and separately to the end sections 151, 152. In the example of the figures, the deformation bar 154 is connected to the end sections 151, 152 by means of two pairs of connection bars 157, 157', 158, 158' disposed symmetrically but equally spaced apart.

Furthermore, the deformation bar 154 comprises at least two resistive elements 155, 156 which are sensitive to deformation.

In one particular embodiment, the two deformation-sensitive resistive elements 155, 156 are adhered to the deformation bar 154. Of course, it is possible to use any type of adhesive, e.g. epoxy adhesive or a cyanoacrylate adhesive.

In one example, the deformation-sensitive resistive elements 155, 156 are semi-conductive strain gauges.

In practice, each deformation-sensitive resistive element has at least one electric characteristic which varies depending on the deformation thereof.

Thus, by fixing the deformation-sensitive resistive elements 155, 156 to the deformation bar 154, the electric characteristic varies depending on a deformation state of the deformation bar 154. In other words, the deformation sensor 120 is thus configured to convert into electrical signals the lengthening, shortening, bending or buckling which the support leg 111 undergoes under the effect of a traction or compression force produced by the introduction or extraction of the bulk material.

The deformation sensor 120 is further provided to convert the detected deformations into deformation values and to generate at least one measurement signal which comprises the deformation values.

For this purpose, as illustrated in the figures, the deformation sensor 120 further comprises an electronic circuit 159 electrically connected to the deformation-sensitive resistive elements 155, 156. In practice, each deformation-sensitive resistive element 155, 156 has electric bonding pads for electrical connection to the electronic circuit.

In the invention, the electronic circuit 159 is adapted to measure the electric characteristic of each deformation-sensitive resistive element and to generate the measurement signal.

In one particular embodiment, the electronic circuit 159 generates a measurement signal for each deformation value.

In another particular embodiment, the electronic circuit 159 generates a measurement signal for a plurality of deformation values.

In one particular embodiment, the electronic circuit 159 is further adapted to generate an auxiliary signal which is associated with the measurement signal.

In one particular embodiment, the electronic circuit 159 generates an auxiliary signal for each measurement signal.

In one example, the electronic circuit 159 is adapted to add an identifier of the silo 110 to the auxiliary signal. In this way, as the measurement signal is associated with the auxiliary signal, it is possible to distinguish between the measurement signals associated with different silos.

In one example, the electronic circuit 159 is adapted to add a timestamp of the acquired deformation values to the auxiliary signal. In this way, as the measurement signal is associated with the auxiliary signal, it is possible to determine a speed of variation of the detected deformation values.

Returning to the figure, the first wireless communication means 130 is provided to transmit the measurement signal and the auxiliary signal over a communication network 10.

In one particular embodiment, the first wireless communication means 130 transmits the measurement signal and the auxiliary signal at a predetermined transmission frequency.

In one particular embodiment, the first wireless communication means 130 is selected from a radio-frequency communication module, an infrared communication module, an optical communication module, a magnetic communication module, an induction communication module.

In another particular embodiment, the communication network 10 is of a known type (e.g. Wi-Fi®, Bluetooth®, ZigBee®, SigFox®, LoRaWan®, GPRS, UMTS, LTE, WiMax, NB-IOT).

In the figure, the first wireless communication means 130 is contained in a first housing. In one example, the first housing is fixed to the support leg 111 of the silo 110 by clamping collars.

In one particular embodiment, as illustrated in the figure, the deformation sensor 120 further comprises a connector 160 electrically connected to the electronic circuit 159. In the invention, the connector 160 is provided to make a wired connection between the deformation sensor 120 and the first wireless communication means 130.

In the figure, the deformation sensor 120 further comprises a second housing 170 provided to enclose the middle section 153 of the proof body and the connector 160, the latter protruding from the second housing 170.

In one particular embodiment, the first housing and the second housing 170 are formed from at least one polymeric material e.g. selected from the group formed by polyimide, polyolefins (in particular polyethylene (PE)—in particular high density polyethylene (HDPE) or low density polyethylene (LDPE)—polyethylene terephthalate (PET), polypropylene (PP), polyethylene naphthalate (PEN), and cyclic olefin copolymer (COC)), polymethyl methacrylate (PMMA), polycarbonate (PC), polyether ether ketone (PEEK), polyvinyl chloride (PVC), acrylonitrile butadiene styrene (ABS), and halocarbon polymers (in particular fluorocarbons such as polytetrafluoroethylene (PTFE) and polyvinylidene fluoride (PVDF)).

In another example, the system 100 further comprises a temperature sensor (not shown) provided to measure at least one temperature in the proximity of the support leg 111 of the silo 110. The temperature sensor is further provided to convert the temperature into a temperature value and to add the temperature value to the measurement signal.

In another example, the system 100 further comprises a geolocation sensor (not shown) electrically connected to the electronic circuit 159. The geolocation sensor is provided to determine a geographical position of the deformation sensor 120. The geolocation sensor is further provided to convert the geographical position into a geographical position value and to add the geographical position value to the auxiliary signal. In this way, a supplier of bulk material can easily be directed to the silo or silos to fill.

In one variant, the system 100 does not have a geolocation sensor. In this case, it is possible to locate the geographical position of the deformation sensor 120 by virtue of the signals transmitted on the communication network 10. Indeed, in certain communication networks 10, the position of the first wireless communication means 130 and of the second wireless communication means is known. In this case, it is possible, e.g. to triangulate the position of a deformation sensor 120 in particular depending on the signals transmitted on the communication network 10.

Returning to the figure, the remote server 140 comprises a second wireless communication means (not shown) and a processor (not shown).

The second wireless communication means is provided to receive the measurement signal and the auxiliary signal.

The processor is provided to effect digital processing of the measurement signal and of the auxiliary signal so as to obtain an estimation of the filling level of the silo 110 according to the measurement signal and the auxiliary signal.

Thus, in the invention, the computing power is transferred to the remote server. This is different from the prior art in which computation is carried out locally in proximity to the sensors.

In practice, the processor uses a plurality of measurement signals and auxiliary signals to determine a mathematical law which links the variations of the deformation values and a filling rate of the silo 110.

In particular, the mathematical law can be determined at the time of the first total filling of the silo 110 from an initial empty state. In this case, the variation of the measured deformation values is considered to be a variation of 0% to 100% filling of the silo 110.

The rate of introduction of the bulk material into the silo 110 during this first filling does not need to be constant but can vary and the filling can be continuous or intermittent (in several filling steps). Knowledge of the maximum capacity of the silo 110 is not necessary, nor is that of the mass density of the bulk material introduced into the silo 110. However, such data can make it possible to refine the determined filling rate. During emptying, the progress of the deformation detected by the deformation sensor 120 and the comparison of any value corresponding to the maximum value detected by the deformation sensor 120 makes it possible to deduce therefrom (with the aid of a mathematical law established according to the particular parameters relating to the silo 110 and the nature of the bulk material in particular) a residual volume in the silo 110 or a filling rate value. This thus makes it possible e.g. to provide an alarm when this filling rate approaches zero or falls e.g. below 10%, 20% or even 30%. Despite a few approximations, the inventors have surprisingly noted that such a method allows a result to be obtained which has a precision between 2% and 20%, e.g. of the order of 10%, such a precision being largely sufficient and reliable for most applications and manufacturers using silos mounted on support legs on the ground.

In another embodiment, the mathematical law can be determined upon filling/emptying of the silo 110, and this is possible irrespective of the filling state of the silo 110. Indeed, the inventors have noted that the filling of a silo 110 is effected rapidly, whereas emptying takes place more slowly. Thus, it is possible to deduce a maximum/minimum filling value of the silo 110 from the speed of variation of the deformation values detected by the deformation sensor 120.

In practice, the maximum value is associated with one of the last deformation values which precedes a deceleration in the speed of variation of the deformation values detected by the deformation sensor 120 beyond a predetermined deceleration value. Furthermore, the minimum value is associated with one of the last deformation values which precedes an acceleration in the speed of variation of the deformations detected by the deformation sensor 120 beyond a predetermined acceleration value. In this way, the maximum/minimum filling value of the silo 110 can be updated each time the silo 110 is filled/emptied.

In one embodiment, the digital processing of the measurement signal and of the auxiliary signal by a processor comprises the determination of a group of corrective parameters of the estimation of the filling level of the silo 110.

In one example, the processor deduces corrective parameters of the estimation of the filling level of the silo 110 from temperature values contained within the measurement signals. In this way, the estimation of the filling level of the silo 110 takes into account the deformations of the support leg 111 of the silo 110 under the effect of temperature. Indeed, in certain meteorological situations, the temperature at the support leg 111 of the silo 110 can induce deformations similar to those produced by filling of the silo 110.

In another example, the processor deduces corrective parameters of the estimation of the filling level of the silo 110 from the detected deformation values. In this way, the estimation of the filling level of the silo 110 takes into account a drift of the deformation sensor 120 under the effect of the weather. Indeed, the acquisition performance of the deformation sensor 120 can be degraded by the weather.

The invention also relates to a method 200 for measuring the filling rate of the silo 110 as illustrated by the figure.

In step 210, as explained above, the deformation sensor 120 is provided.

In step 220, as explained above, the deformation sensor 120 is fixed on a single support leg 111 of the silo 110.

In step 230, as explained above, the first communication means is provided.

In step 240, as explained above, the first communication means is fixed on the support leg 111 of the silo 110.

In step 250, as explained above, a wired connection is made between the deformation sensor 120 and the first communication means.

And, in step 260, the remote server 140 is provided.

The invention has been presented with reference to the industrial or agricultural sectors. However, it is evident that it can be applied in principle to any other type of sector which uses silos mounted on support legs on the ground.

The invention can cover numerous variants and applications other than those described above. In particular, unless stated otherwise, the different structural and functional features of each of the embodiments described above do not have to be considered as being combined and/or closely and/or inextricably linked with each other, but in contrast considered as simple juxtapositions. Furthermore, the structural and/or functional features of the different embodiments described above can form, in their entirety or in part, any different juxtaposition or any different combination.

The invention claimed is:

1. A system for measuring the filling level of a silo for storing and mixing at least one bulk material, the silo being provided with a plurality of support legs on the ground, the system comprising:
   a single deformation sensor provided to be fixed to a single support leg of the silo so that the deformation sensor can detect the deformations of the support leg in response to the introduction or extraction of the bulk material, the deformation sensor being provided to convert the detected deformations into deformation values in order to generate at least one measurement signal which comprises the deformation values, a first wireless communication means provided to transmit the measurement signal, and a remote server which comprises a second wireless communication means and a processor, the second wireless communication means being provided to receive the measurement signal, the processor being provided to effect digital processing of the measurement signal so as to obtain an estimation of the filling level of the silo from a mathematical law which links the filling rate of the silo and the variation of the deformation values contained within the measurement signal.

2. The system according to claim 1, wherein the deformation sensor further comprises an electronic circuit to generate the measurement signal, furthermore, the deformation sensor comprises a connector electrically connected to the electronic circuit, the connector being provided to make a wired connection between the deformation sensor and the first wireless communication means.

3. The system according to claim 1, wherein the deformation sensor is further provided to generate an auxiliary signal which is associated with the measurement signal,
the electronic circuit is adapted to add a timestamp of the acquired deformation values to the auxiliary signal,
the first wireless communication means is further provided to transmit the auxiliary signal,
the second wireless communication means is further provided to receive the auxiliary signal, and
the processor is further provided to effect digital processing of the auxiliary signal.

4. The system according to claim 3, further comprising a temperature sensor provided to measure at least one temperature in the proximity of the support leg of the silo, to convert the temperature into a temperature value and to add the temperature value to the measurement signal.

5. The system according to claim 3, further comprising a geolocation sensor provided to determine a geographical position of the deformation sensor, to convert the geographical position into a geographical position value and to add the geographical position value to the auxiliary signal.

6. The system according to claim 3, wherein the processor determines the filling level of the silo according to—in addition—a speed of variation of the detected deformation values.

7. The system according to claim 1, wherein the digital processing of the measurement signal and of the auxiliary signal by the processor comprises the determination of a group of corrective parameters which permit the effect of the temperature on the support leg of the silo and the effect of the weather on the acquisition performance of the deformation sensor to be taken into account.

8. The system according to claim 1, wherein the deformation sensor comprises a proof body which comprises two end sections through which the proof body can be fixed to the support leg of the silo.

9. The system according to claim 8, wherein the deformation sensor is fixed to the support leg of the silo by screws.

10. The system according to claim 1, wherein the deformation sensor is fixed to the support leg of the silo by adhesive.

11. The system according to claim 1, further comprising a housing provided to enclose a middle section of the proof body and the connector, the connector protruding from the housing.

12. A method for measuring the filling level of a silo for storing and mixing at least one bulk material, the silo being provided with a plurality of support legs on the ground, the method comprising:

a first step of providing a single deformation sensor provided to be fixed to a single support leg of the silo so that the deformation sensor can detect deformations of the support leg in response to the introduction or extraction of the bulk material, the deformation sensor being provided to convert the detected deformations into deformation values in order to generate at least one measurement signal which comprises the deformation values, a first step of fixing the deformation sensor to the support leg of the silo, a second step of providing a first wireless communication means provided to transmit the measurement signal, and a second step of fixing the first wireless communication means to the support leg of the silo, a step of making a wired connection between the deformation sensor and the first communication means, and a third step of providing a remote server which comprises a second wireless communication means and a processor, the second wireless communication means being provided to receive the measurement signal, the processor being provided to effect digital processing of the measurement signal so as to obtain an estimation of the filling level of the silo from a mathematical law which links the filling rate of the silo and the variation of the deformation values contained within the measurement signal.

\* \* \* \* \*